United States Patent
Yang

(10) Patent No.: US 7,385,886 B2
(45) Date of Patent: Jun. 10, 2008

(54) OPTICAL DISK DRIVE AND METHOD OF CONTROLLING SPINDLE MOTOR THEREOF

(75) Inventor: Jak-heun Yang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 709 days.

(21) Appl. No.: 10/919,412

(22) Filed: Aug. 17, 2004

(65) Prior Publication Data
US 2005/0052961 A1  Mar. 10, 2005

(30) Foreign Application Priority Data
Sep. 5, 2003  (KR) ............. 10-2003-0062241

(51) Int. Cl.
*G11B 7/00* (2006.01)
(52) U.S. Cl. .................. 369/44.25; 369/44.29
(58) Field of Classification Search .......... None
See application file for complete search history.

(56) References Cited

U.S. PATENT DOCUMENTS 4,630,252 A * 12/1986 Miura et al. ......... 369/44.25
6,424,605 B1 * 7/2002 Iida ................... 369/44.27
6,937,546 B2 * 8/2005 Ono .................. 369/44.28

FOREIGN PATENT DOCUMENTS

| JP | 09-312059 | 12/1997 |
|---|---|---|
| JP | 2001-134962 | 5/2001 |
| JP | 2001-195743 | 7/2001 |
| JP | 2002-074819 | 3/2002 |
| JP | 2002-230808 | 8/2002 |
| KR | 10-2000-0033294 A | 6/2000 |
| KR | 10-2000-0039574 A | 7/2000 |

* cited by examiner

*Primary Examiner*—Joseph Feild
*Assistant Examiner*—Joseph Haley
(74) *Attorney, Agent, or Firm*—Roylance, Abrams, Berdo and Goodman, LLP

(57) ABSTRACT

An optical disk drive and a method thereof for controlling an optical disk drive spindle motor to adaptively stop the rotation according to the varying level of a detected tracking error signal. The optical disk drive directs the operation of the spindle motor by controlling driving voltage values to be supplied to the spindle motor depending on the level of a tracking error signal which varies according to the RPM of the optical disk.

15 Claims, 6 Drawing Sheets

OPTICAL DISK DRIVE AND METHOD OF CONTROLLING SPINDLE MOTOR THEREOF

CROSS-REFERENCE TO RELATED APPLICATIONS

This application claims the benefit under 35 U.S.C §119 (a) of Korean Patent Application No. 2003-62241 entitled "Optical Disk Drive And Method Of Controlling Spindle Motor Thereof", filed in the Korean Intellectual Property Office on Sep. 5, 2003, the entire contents of which are incorporated herein by reference.

BACKGROUND OF THE INVENTION

1. Field of the Invention

The present invention relates to an optical disk drive and a method of controlling a spindle motor thereof. More particularly, the present invention relates to an optical disk drive and a method thereof for controlling a spindle motor to adaptively stop the spindle motor rotation according to the varying level of a detected tracking error signal.

2. Description of the Related Art

An optical disk drive, which records data on an optical disk or reproduces recorded data, usually includes, in addition to other components, a spindle motor. The spindle motor rotates the optical disk mounted on a tray at a predetermined speed, and is typically a brushless motor which provides a detected RPM (Revolutions Per Minute) value using a hole sensor.

FIG. 1 is a block diagram illustrating such a conventional optical disk drive.

Referring to FIG. 1, an optical disk drive 100 includes a spindle motor 110, a motor driver 120, and a motor controller 130.

The motor driver 120 supplies a predetermined driving voltage to drive the spindle motor 110.

When supplied with the predetermined driving voltage from the motor driver 120, the spindle motor 110 is rotated clockwise or counter-clockwise at a speed corresponding to the driving voltage, and an optical disk 110a is rotated in a direction corresponding to the rotation of the spindle motor 110.

When a brushless motor having a hole sensor (not shown) is used as the spindle motor 110, the spindle motor 110 is provided with a frequency generator (FG) 112. The FG 112 generates a pulse form FG signal corresponding to an RPM of the spindle motor 110 detected by the hole sensor (not shown). The FG signal is then transmitted to the motor controller 130.

The motor controller 130 counts the number of pulses of the FG signal transmitted from the spindle motor 110 for a predetermined time to detect the RPM of the spindle motor 110. Based on the detected RPM, the motor controller 130 controls the operation of the motor driver 120. For example, in order to stop the rotation of the spindle motor 110, the motor controller 130 controls the motor driver 120 to supply the spindle motor 110 with a brake driving voltage corresponding to the detected RPM as based on the number of pluses of the FG signal. As the spindle motor 110 is supplied with the brake driving voltage, the spindle motor 110 completely stops rotation.

However, since the conventional optical disk drive 100 uses brushless motor technologies to control the operation of the spindle motor 110, the optical disk drive 100 is required to employ the hole sensor (not shown) to generate the FG signal corresponding to the RPM of the spindle motor 110. Accordingly, manufacturing costs increase and it is exceedingly difficult to achieve the desired size and simplicity required by such a product.

Also, in the conventional optical disk drive 100, a tray (not shown) can be unintentionally opened during the rotation of the optical disk 100a when a user stops the reproduction of the optical disk 100a. Therefore, physical damage can occur in the optical disk, sometimes resulting in reproduction failures of the optical disk 100a.

Accordingly, a need exists for a system and method to safely control an optical disk drive spindle motor, such as a DC motor, without requiring any additional costly devices such as a hole sensor.

SUMMARY OF THE INVENTION

The embodiments of the present invention have been developed to solve the above and other problems in the related art. Accordingly, it is one aspect of the present invention to provide an optical disk drive and a method thereof for controlling a spindle motor, which is capable of adaptively stopping the rotation of the spindle motor without requiring an extra sensor to detect an RPM of the spindle motor.

The above and other aspects are achieved by providing an optical disk drive which controls a spindle motor depending on the level of a tracking error signal which varies according to the RPM of the disk.

The level of the tracking error signal is obtained from signals detected from the disk when the focusing servo is in an on-state, and the tracking servo is in an off-state. As known to those skilled in the art, a 3-beam method can be used as a tracking error detection method for the reproduction of CD devices, however, a differential push-pull method can also be used. Both methods detect a tracking error by focusing three spots of light onto an optical recording medium. The use of a 3-beam method or push-pull method to detect the tracking error signal also requires a filter to boost a predetermined specific frequency, while other methods, such as the differential phase detection (DPD) method does not require such a filter.

The spindle motor of each embodiment of the present invention is controlled by the applied driving voltage. According to an embodiment of the present invention therefore, the spindle motor is controlled by providing a predetermined reverse voltage as the driving voltage until the level of the tracking error signal is less than or equal to a predetermined threshold value and then providing, for a predetermined time, a constant voltage to prevent the reverse-rotation of the spindle motor.

According to another embodiment of the present invention, a focusing gain is increased when the tracking servo is in an off-state in order to improve the reliability of a controlling method to stop the spindle motor. Additionally, in a final step for controlling the stopping of the spindle motor, it is determined whether the focusing servo is normal or abnormal, and when the focusing servo is determined to be abnormal, a focusing error is compensated.

The time point where the driving voltage supplied to the spindle motor varies, and the duration for supplying the driving voltage, can be varied according to the design specification of the drive. Also, additional results can be easily obtained through any number of variations of the above steps.

BRIEF DESCRIPTION OF THE DRAWINGS

The above aspects and other advantages of the present invention will be apparent by describing an exemplary embodiment of the present invention with reference to the accompanying drawings, in which.

DETAILED DESCRIPTION OF THE EXEMPLARY EMBODIMENT

Hereinafter, the embodiments of the present invention will be described in greater detail with reference to the accompanying drawings.

Figure 1:
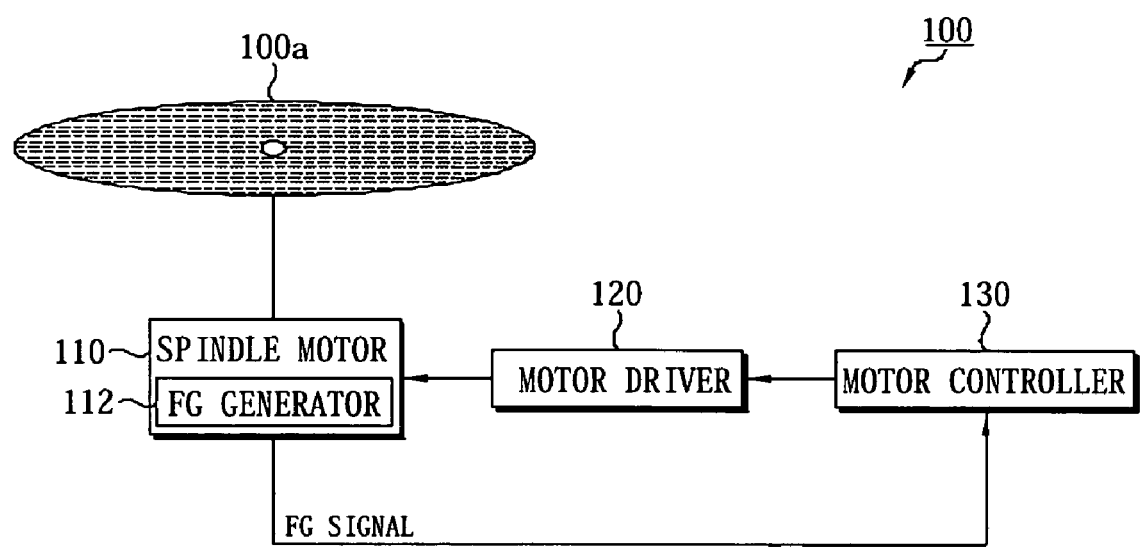
FIG. 1 is a block diagram showing a conventional optical disk drive controlling a spindle motor.
Figure 2:
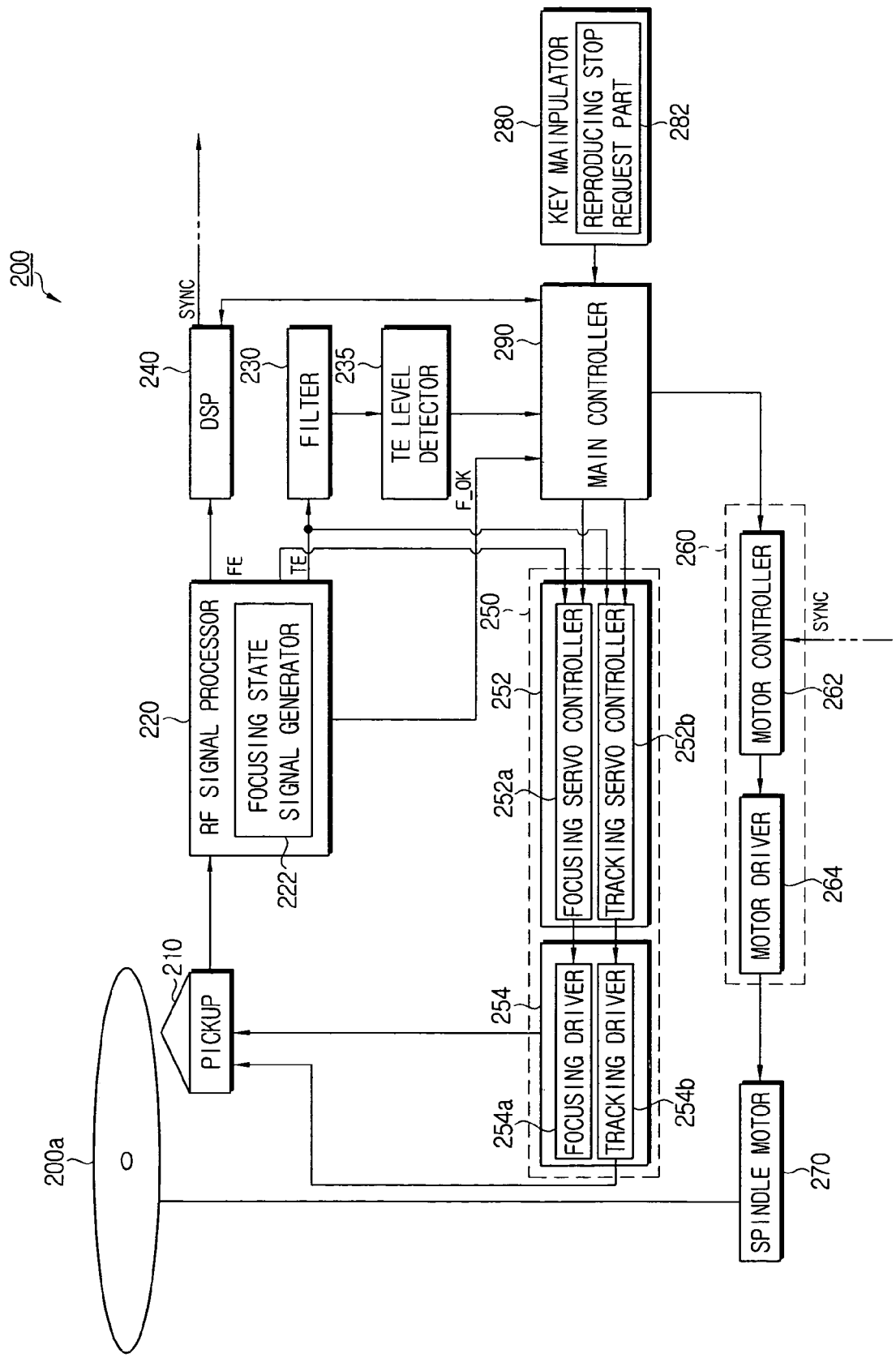
FIG. 2 is a block diagram showing an optical disk drive controlling a spindle motor according to an embodiment of the present invention.

FIG. 2 is a block diagram showing an optical disk drive controlling a spindle motor according to an exemplary embodiment of the present invention.

Referring to FIG. 2, an optical disk drive 200 includes a pickup 210, a radio frequency (RF) signal processor 220, a filter 230, a tracking error (TE) level detector 235, a digital signal processor (DSP) 240, a servo processor 250, a motor processor 260, a spindle motor 270, a key manipulator 280, and a main controller 290.

The optical disk drive 200 illustrated in FIG. 2 is an apparatus that records and/or reproduces data on and/or from an optical disk 200a, which is generally applicable to optical recording/reproducing apparatus such as a Compact Disk Player (CDP), Digital Video Disk Player (DVDP), and a Digital Video Disk Recorder (DVDR). Still other recording/reproducing apparatus including, but not limited to a Compact Disk (CD), Video Compact Disk (VCD), and a Digital Video Disk (DVD) may exemplify the optical disk 200a. For convenience in the detailed description below, FIG. 2 shows only the components associated with the control operations of the spindle motor 270 in the optical disk drive 200.

The pickup 210 optically reads data from the optical disk 200a, and transforms the read data into an RF signal, and then outputs the transformed RF signal. The pickup 210 includes a laser diode (LD) (not shown), an object lens (not shown), a photo diode (PD) 300, a focusing actuator (not shown), and a tracking actuator (not shown).

The LD emits laser beams which are focused by an object lens. The object lens is interposed between the LD and the optical disk 200a to focus the laser beams emitted from the LD onto a surface of the optical disk 200a.

Figure 3:
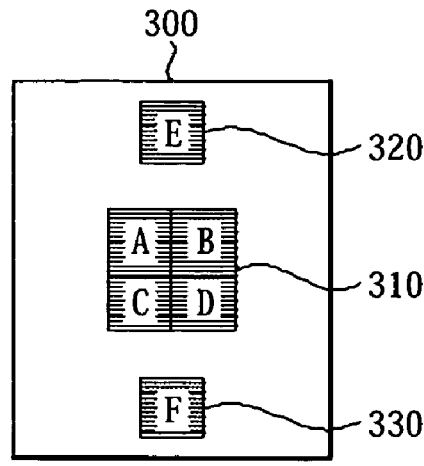
FIG. 3 is a view showing an example of the photo-diodes provided in the pickup of FIG. 2.

The PD 300 operates as a sensor to detect the laser beams reflected from the surface of the optical disk 200a, and can be provided in any number of configurations as shown in the example of FIG. 3. Referring to FIG. 3, the PD 300 is comprised of a center photo-sensor 310 and surrounding photo-sensors 320 and 330. Signals, such as signals A, B, C and D, are detected and separated by the center photo-sensor 310, and are used for generating a focusing error (FE) signal. Additional signals, such as signals E and F, are detected by the surrounding photo-sensors 320 and 330, and are used for generating a tracking error (TE) signal. The number of photo-sensors and the number of signals separated by the photo-sensors are not limited to those shown in FIG. 3.

The focusing actuator (not shown) of the pickup 210 vertically drives the object lens (not shown) using a focusing servo to accurately focus the laser beams emitted from the LD onto the surface of the optical disk 200a. The tracking actuator (not shown) horizontally drives the object lens using a tracking servo, such that the pickup 210 accurately traces the tracks formed on the optical disk 200a.

Returning to FIG. 2, the RF signal processor 220 amplifies and shapes the RF signal output from the pickup 210 into a waveform, thereby generating an eight-to-fourteen modulation (EFM) signal. The EFM signal is then transmitted to the DSP 240, which is described in greater detail below.

The RF signal processor 220 generates the FE signal for the focusing servo by using the signals A, B, C and D detected by the center photo-sensor 310, while generating the TE signal for the tracking servo by using the signals E and F detected by the surrounding photo-sensors 320 and 330. The generated FE signal is transmitted to a focusing servo controller 252a, while the TE signal is transmitted to a filter 230 and a tracking servo controller 252b.

In order to generate the TE signal, the RF signal processor 220 adaptively selects a 3-beam method, a DPD (differential phase detection) method, or a push-pull method, depending on the kind of optical disk 200a and pickup 210. Since the 3-beam method, the DPD method and the push-pull method are well known to those skilled in the art, detailed descriptions of each will be omitted.

The RF signal processor 220 includes a focusing state signal generator 222 to determine whether the focusing servo is operating normally or abnormally. More specifically, the focusing state signal generator 222 determines whether the laser beams are accurately focused onto the optical disk 200a. The focusing state signal generator 222 has a peak detector 222a and a comparator 222b as shown in FIG. 4.

Figure 4:
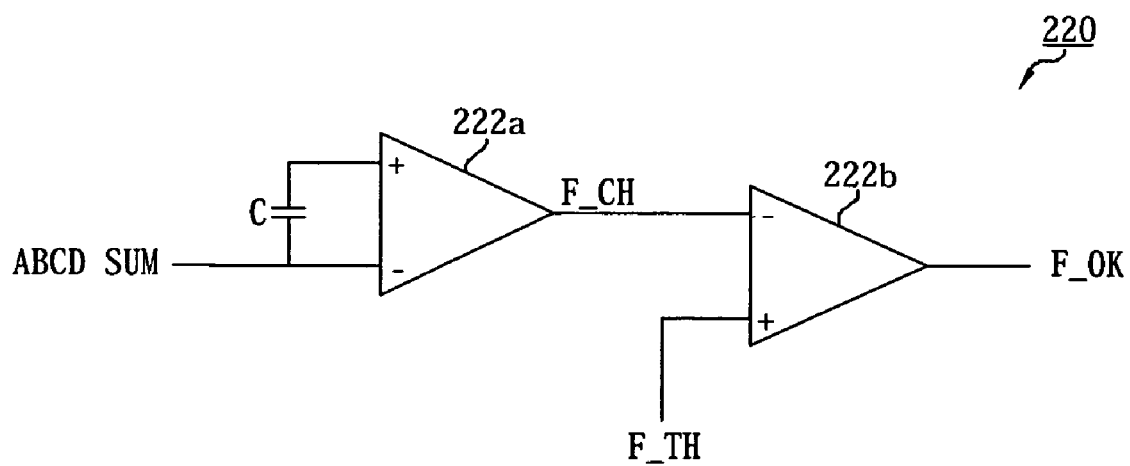
FIG. 4 is a view showing an example focusing state signal generator of FIG. 2.
Figure 5:
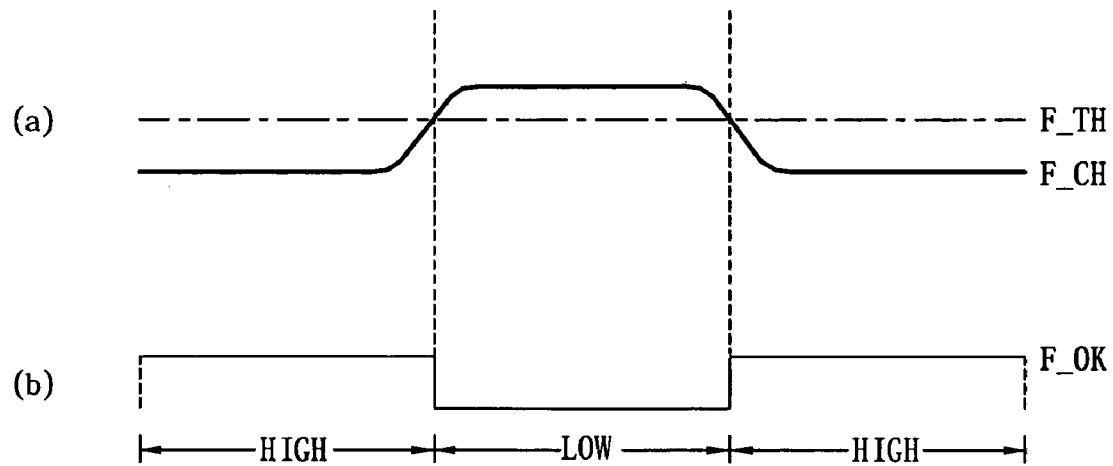
FIGS. 5A and 5B are views showing examples of signals output from the peak detector and the comparator of FIG. 4.

Referring to FIG. 4, the peak detector 222a uses a DC component to add a SUM signal of the signals A, B, C and D detected by the center photo-sensor 310 (i.e., ABCD SUM), to an ABCD SUM signal coupled via a condenser C, thereby generating DC variation signal F_CH. Specifically, the peak detector 222a detects a peak of the ABCD SUM signal and outputs the ABCD SUM signal having a waveform as shown in FIG. 5A. The comparator 222b compares the ABCD SUM signal output (i.e., F_CH) with a pre-set focus threshold F_TH, and outputs a focusing state signal F_OK having a waveform as shown in FIG. 5B. In the graphical representation showing the waveform of the focusing state signal F_OK in FIG. 5B, the interval 'low' represents the condition where the focusing is normal, and the interval 'high' represents the condition where the focusing is dropped. The "focusing dropped" indicates that an error has occurred in the focusing operation of the beams due to the varying distance between the object lens (not shown) and the optical disk 200a, which can further indicate that the focusing servo is off.

Figure 6:
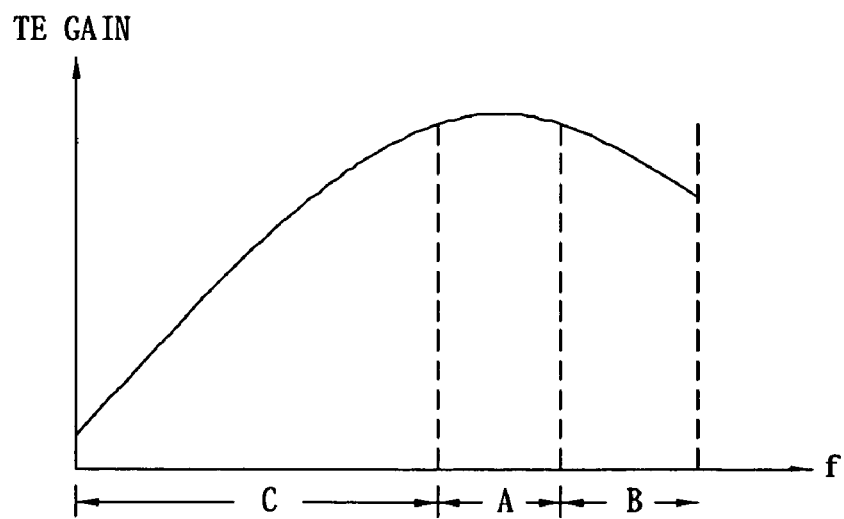
FIG. 6 is a graph showing one example of a gain of a TE signal corresponding to a frequency set by the filter of FIG. 2.

Returning to FIG. 2, the filter 230 can be configured as an equalizer that detects a gain of the TE signal (i.e., TE gain) transmitted from the RF signal processor 220. Specifically, the filter 230 sets the gain of the TE signal corresponding to the frequency as shown in FIG. 6, thereby filtering the gain of the low frequency TE signal. The filtered gain is then used in detecting a level of the TE signal.

In applications for reproducing the data in the 3-beam method and the push-pull method, the filter 230 easily detects the level of the TE signal according to the increased revolution period, that is, the decreased frequency. In that case, the pickup 210 cannot detect the level of the TE signal according to the increased revolution period because the level of the TE signal is not changed, although the revolution period is increased as the RPM of the spindle motor 270 decreases. Therefore, the filter 230 filters the gain corresponding to the frequency (f) of the TE signal as shown in graph of FIG. 6. In FIG. 6, interval A indicates a condition in which the spindle motor 270 is normally rotated, interval B indicates a condition in which a crosscutting occurs, and interval C indicates a condition in which the RPM of the spindle motor 270 is decreased.

In applications for reproducing the data in the DPD method, the RF signal output from the RF signal processor 220 is changed to a low frequency signal as the RPM of the spindle motor 270 is decreased. Therefore, a phase difference i.e., the level of the TE signal, is gradually decreased, and when the spindle motor is stopped, a predetermined DC level is output. Accordingly, when the data is reproduced in the DPD method, the TE signal is directly input into a TE level detector 235 without passing through the filter 230.

The TE level detector 235 detects a peak-to-peak level from the gain of the TE signal provided from the filter 230. In this embodiment example, the level of the TE signal is used by the main controller 290 to determine a point of time when the operation of the spindle motor 270 is stopped by a reproducing stop request signal from a reproducing stop request part 282. A detailed description of the reproducing stop request part is described in greater detail below. The detected TE signal level is then temporarily stored in a storage part (not shown).

The DSP 240 performs a decoding and an error correction with respect to the FEM signal, which is obtained at the RG signal processor 220 in a waveform shape, and processes the signal into a digital video/audio signal. The DSP 240 also detects a synchronization signal of the data stream from the EFM signal using a PLL (Phase Locked Loop) circuit (not shown). The detected synchronization signal is then transmitted to the motor controller 262, which is also described in greater detail below.

The servo processor 250 includes a servo controller 252 to control the focusing servo and the tracking servo, and a servo driver 254 to output a predetermined driving voltage to drive the pickup 210.

The servo controller 252 includes a focusing servo controller 252a and a tracking servo controller 252b.

The focusing servo controller 252a digitizes the FE signal generated by the RF signal processor 220. Also, the focusing servo controller 252a outputs a control signal to the focusing driver 254a to drive the focusing actuator (not shown) corresponding to the digitized FE signal, i.e., a focusing adjustment signal for the focusing servo.

The tracking servo controller 252b digitizes the TE signal generated by the RF signal processor 220. Also, the tracking servo controller 252b outputs a control signal to the tracking driver 254b to drive the tracking actuator (not shown) corresponding to the digitized TE signal, i.e., outputs a tracking adjustment signal for the tracking servo.

The servo driver 254 includes the focusing driver 254a and the tracking driver 254b.

The focusing driver 254a adaptively drives the focusing actuator (not shown) using a predetermined focusing driving voltage corresponding to the focusing adjustment signal output from the focusing servo controller 252a. The tracking driver 254b adaptively drives the tracking actuator (not shown) using a predetermined tracking driving voltage corresponding to the tracking adjustment signal output from the tracking servo controller 252b.

Accordingly, the laser beams emitted from the LD (not shown) are focused onto the optical disk 200a under the controls of the focusing servo controller 252a and the focusing driver 254a, while being guided along the track of the optical disk 200a under the controls of the tracking servo controller 252b and the tracking driver 254b.

The motor processor 260 includes a motor controller 262 and a motor driver 264.

The motor controller 262 outputs an RPM control signal of the spindle motor 270 to the motor driver 264 under the control of the main controller 290, which is described in greater detail below. Specifically, the motor controller 262 outputs a rotation signal or a stop signal to the motor driver 264 to either rotate the spindle motor 270 at a predetermined speed, or to stop the rotation of the spindle motor 270, respectively.

Also, the motor controller 262 further detects the RPM of the spindle motor 270 using a synchronization signal transmitted from the DSP 240 during the reproducing operation of the data with respect to the optical disk 200a, and controls a Constant Linear Velocity (CLV) of the optical disk 200a according to the detected RPM.

The motor driver 264 supplies the spindle motor 270 with a driving voltage to rotate, or to stop the spindle motor 270, according to the rotation signal or the stop signal output from the motor controller 262, respectively. For example, in order to rotate the spindle motor 270 for the first time, the motor controller 262 switches on an initial rotating signal or an initial driving voltage signal to supply an initial driving voltage to the spindle motor 270. The motor driver 264 then supplies the spindle motor 270 with the initial driving voltage corresponding to the initial rotation signal. The initial driving voltage is a voltage that rotates the optical disk 200a at an initial speed.

When a reproducing stop request signal is output from the reproducing stop request part 282 during the reproducing operation of data with respect to the optical disk 200a, the motor controller 262 detects a current RPM of the spindle motor 270 according to the control of the main controller 290. The motor controller 262 then switches on a predetermined stop signal to decrease the detected RPM, and outputs the stop signal to the motor driver 264. On receipt of the stop signal from the motor controller 262, the motor driver 264 supplies the spindle motor 270 with a predetermined brake driving voltage which corresponds to the stop signal.

In the above example, the spindle motor 270 is a DC motor to rotate the optical disk 200a at a predetermined speed, and which rotates in a normal direction or a reverse direction at the speed corresponding to the driving voltage provided from the motor driver 264, or which stops the rotation, thereby stopping the rotation of the optical disk 200a.

The key manipulator 280 includes a plurality of manipulation keys (not shown) for outputting key manipulation signals to the main controller 290. The key manipulation signals are provided for setting or manipulating the functions supported by the optical disk drive 200. In this embodiment example, the key manipulator 280 is provided with the reproducing stop request part 282 which outputs the reproducing stop request signal to stop the reproducing of the data. The key manipulator 280 can be disposed on a body of the optical disk drive 200, or can be implemented as a remote controller (not shown).

The main controller 290 controls the overall operation of the optical disk drive 200 according to various control programs stored in the storage part (not shown) and the key manipulation signals of the key manipulator 280.

For example, the main controller 290 controls the respective parts to read data from the optical disk 200a and convert the data into reproducible signals when receiving a reproducing request signal from the key manipulator 280.

The main controller 290 also determines that the focusing is normal if the focusing state signal F_OK is output with a 'low' signal as shown in FIG. 5B. When the focusing state signal F_OK is output with a 'high signal', the main controller 290 then determines that the focusing is dropped and controls the focusing servo controller 252a to compensate for the focusing error.

The main controller 290 further controls the motor controller 262 to adaptively detect the RPM of the spindle motor 270 according to the synchronization signal generated by the DSP 240.

When receiving the reproducing stop request signal from the reproducing stop request part 282, the main controller 290 controls the respective parts to stop reproducing the data from the optical disk 200a. More specifically, the main controller 290 compares the peak-to-peak value of the TE signal detected by the TE level detector 235 with a predetermined threshold value, and determines the time point when the spindle motor 270 stops rotation. Once the time point when the spindle motor stops rotation is determined, the main controller 290 then controls the optical disk drive to open a tray (not shown) where the optical disk 200a is mounted. A detailed description of the operations noted above are described in greater detail below with reference to FIGS. 7 and 8.

Figure 7:
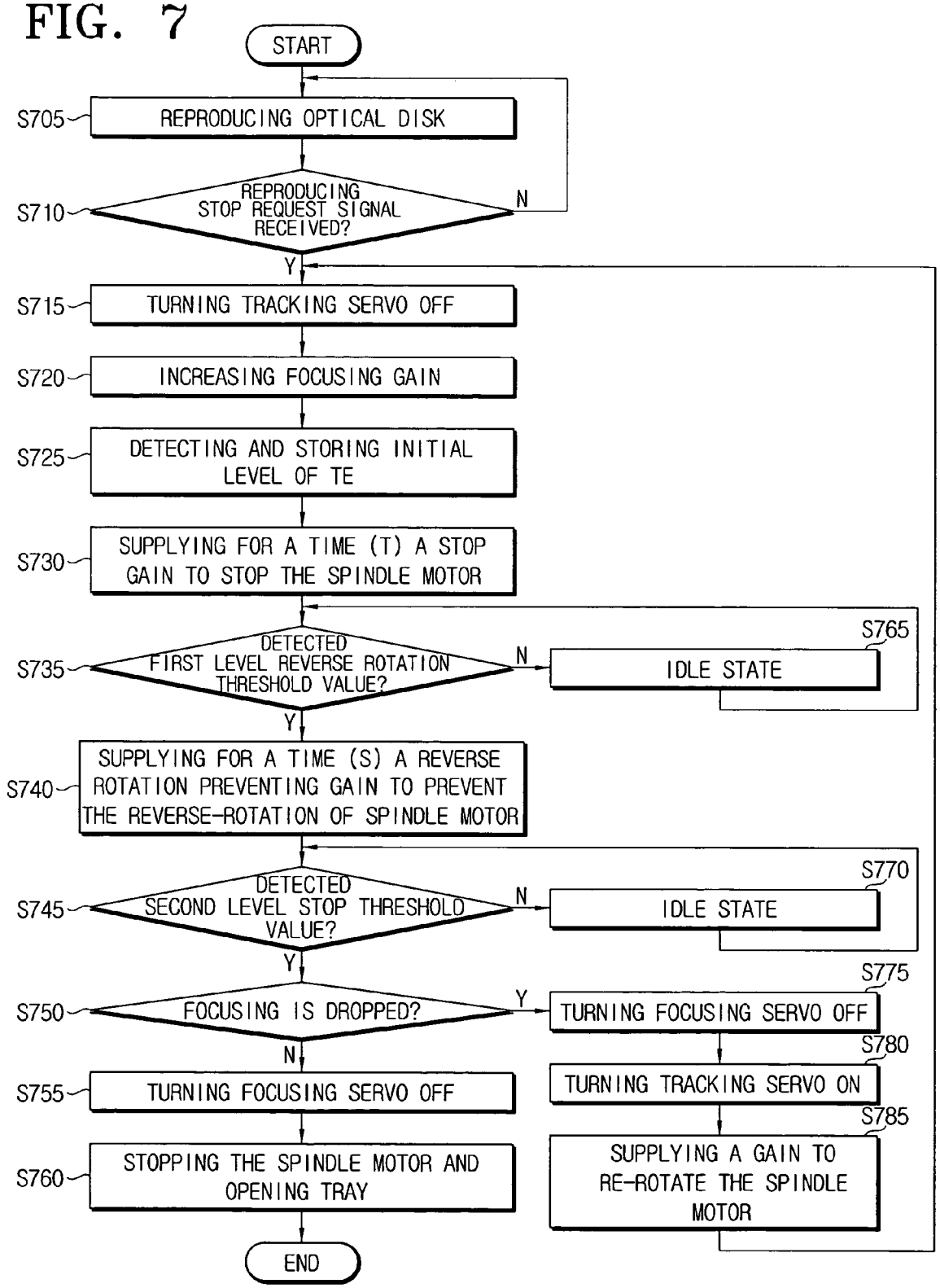
FIG. 7 is a flowchart showing a method of controlling the spindle motor of FIG. 2 according to an embodiment of the present invention.
Figure 8:
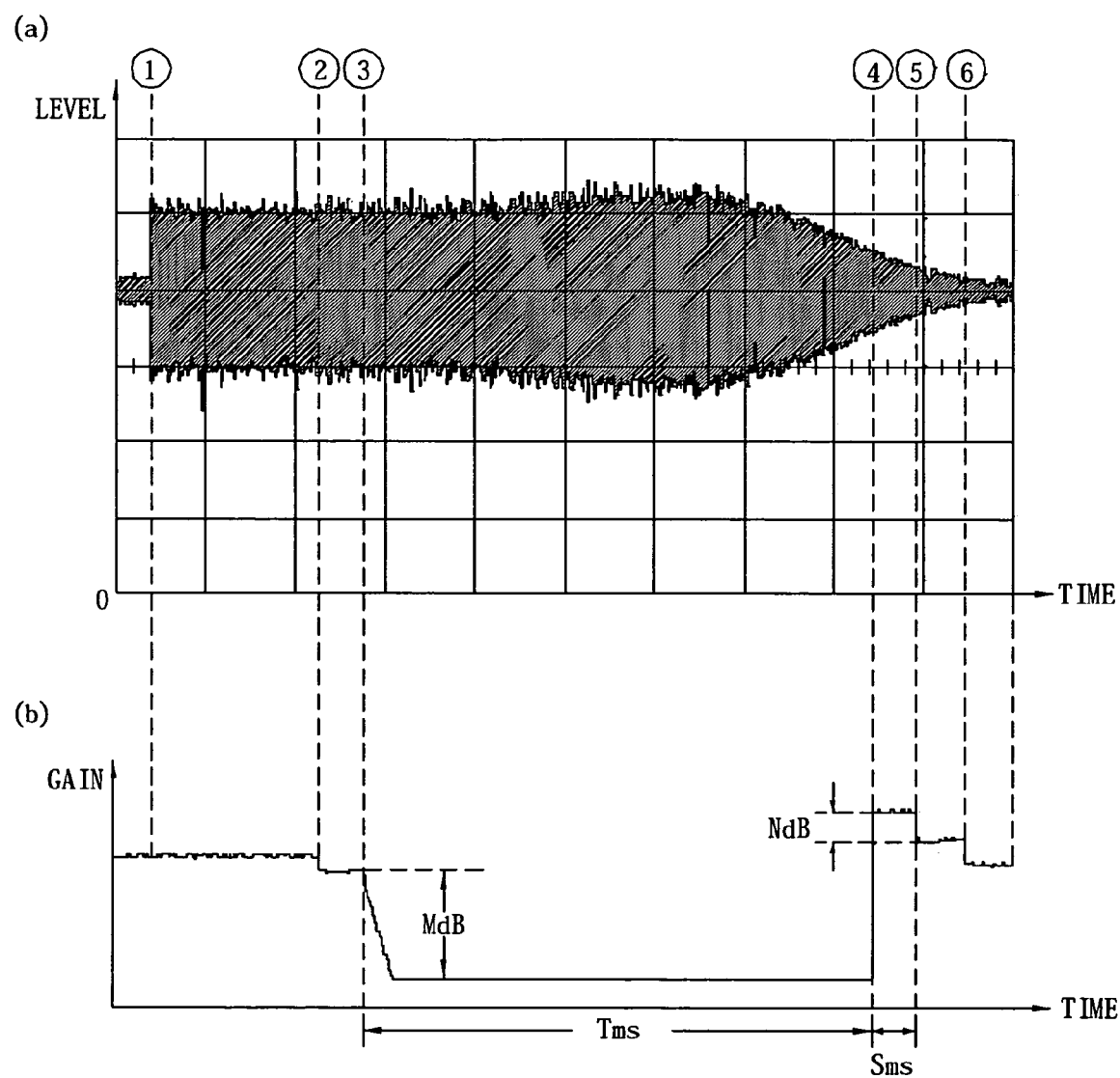
FIG. 8A is a view showing an example variation in a TE level detected by the TE level detector after the selection of the reproducing stop request part of FIG. 2.
FIG. 8B is a view showing example variations in gain supplied to the spindle driver after the selection of the reproducing stop request part of FIG. 2.

FIG. 7 is a flowchart showing an example method of controlling the spindle motor of FIG. 2 in accordance with an embodiment of the present invention.

Referring to FIGS. 2 through 7, when reproducing data from the optical disk 200a as a predetermined video/audio signal at step (S705), it is first determined whether a reproducing stop request signal is received from the reproducing stop request part 282 at step (S710). If a reproducing stop request signal is received, the main controller 290 controls the tracking servo controller 252b to stop the operation of the tracking servo, i.e., to turn the tracking servo off at step (S715). The tracking servo controller 252b supplies the tracking driver 254b with a signal which blocks the supply of a predetermined driving voltage to the tracking actuator (not shown), and thus, the tracking servo is turned off. The TE signal, which is detected by the TE level detector 235 with the tracking servo in an off state, is a signal provided by the crosscutting of the optical disk 200a. Such a TE crosscutting signal is produced by eccentricity of the optical disk 200a, and a level of the crosscutting signal is in proportion to the degree of the eccentricity.

The main controller 290 then controls the focusing servo controller 252a to increase a focusing gain to be supplied to the focusing driver 254a at step (S720). By improving the focusing tracing capability, a focusing error i.e., a focusing drop of the focusing servo which may occur when the brake driving voltage is supplied, can be prevented. As the increased focusing gain is in proportion to a predetermined focusing driving voltage, the step (S720) is provided and serves to increase the focusing driving voltage.

The main controller 290 then controls the optical disk drive such that an initial level of the TE signal detected by the TE level detector 235 is temporarily stored in the storage part (not shown) at step (S725). The main controller 290 then controls the motor controller 262 to supply a predetermined stop gain (M dB) to the spindle motor 270 for a predetermined time (T ms) to stop the rotation of the spindle motor 270 at step (S730). That is, from among a plurality of driving voltages, the motor controller 262, while under the control of the main controller 290, switches on a brake driving voltage signal in proportion to the predetermined stop gain (M dB). The motor driver 264 then supplies the spindle motor 270 with a brake driving voltage corresponding to the brake driving voltage signal for a predetermined time (T ms).

The main controller 290 then compares a brake level (hereinafter referred to as a first level) of the TE signal detected after step (S730) with a predetermined reverse rotation threshold value, and determines a point of time to supply a predetermined reverse rotation preventing gain (N dB) at step (S735). The reverse rotation preventing gain (N dB) can be a gain value that prevents the spindle motor 270 from rotating in the reverse direction. The predetermined reverse rotation threshold value typically falls within the range from approximately 8% to approximately 12% of the initial level of the TE signal detected and stored at step (S725). In this embodiment example, the predetermined reverse rotation threshold value corresponds to approximately 10% of the initial level.

If the first level of the TE signal that is detected after the brake driving voltage is supplied to the spindle motor 270 is determined to be equal to or less than the predetermined reverse rotation threshold value, the main controller 290 controls the motor controller 262 to supply the spindle motor 270 with the predetermined reverse rotation preventing gain (N dB) for a predetermined time (S ms) to prevent the spindle motor from rotating in the reverse direction at step (S740). That is, from among the driving voltages, the motor controller 262, while under the control of the main controller 290, switches on a reverse rotation preventing voltage in proportion to the predetermined reverse rotation preventing gain (N dB) and controls the motor driver 264 to supply the reverse rotation preventing voltage to the spindle motor 270. In this embodiment example, it is preferred that the reverse rotation preventing gain (N dB) is less than the stop gain (M dB), and the duration (S ms) for supplying the reverse rotation preventing gain (N dB) is shorter than the duration (T ms) for supplying the stop gain (M dB).

After step (S740), the main controller 290 then compares a reverse rotation preventing level (hereinafter referred to as a second level) that is detected after step (S740) with a predetermined stop threshold value, and determines a point of time when the spindle motor 270 stops rotation at step (S745). The predetermined stop threshold value typically falls within the range from approximately 3% to approximately 8% of the initial level of the TE signal detected at step (S725), and it corresponds to approximately 5% of the initial level in this embodiment.

In step (S745), if it is determined that the second level of the TE signal that is detected after the reverse rotation preventing voltage is supplied to the spindle motor 270 is identical to or less than the predetermined stop threshold value, the main controller 290 then determines whether the focusing state is normal or abnormal based on the focusing state signal (F_OK) generated from the focusing state signal generator 222 at step (S750).

Specifically, at step (S750), the main controller 290 determines that the focusing servo is normal when receiving a focusing state signal (F_OK) of 'low' from the focusing state signal generator 222, and then controls the focusing servo controller 252a to turn the focusing servo off at step (S755). In order to turn the focusing servo off, the focusing servo controller 252a provides the focusing driver 254a with a control signal directing the driver 254a to not supply a predetermined driving voltage to the focusing actuator (not shown).

When the main controller 290 determines that the spindle motor 270 has stopped rotation, the main controller 290 then directs the optical disk drive to open the tray (not shown) where the optical disk 200a is mounted at step (S760). That is, the main controller 290 checks the rotation/stop state of the spindle motor 270 or the optical disk 200a based on the variation in the level of the TE signal detected by the TE level detector 235.

If it is determined that the first level of the TE signal is greater than the predetermined reverse rotation threshold value at step (S735), an idle state is maintained at step (S765).

If it is determined that the second level of the TE signal is greater than the predetermined stop threshold value in step (S745), an idle state is maintained at step (S770).

When a focusing state signal (F_OK) of 'high' is received from the focusing state signal generator 222 in step (S750), the main controller 290 then determines that the focusing servo is dropped, and controls the focusing servo controller 252a to turn the focusing servo on to compensate for the focusing error at step (S775). The receipt of the focusing state signal (F_OK) of 'high' in step (S750) indicates that the focusing servo is dropped, which can occur, as noted above, by the brake driving voltage supplied at step (S730) which is required so that the second level detected at step (S745) is less than the predetermined stop threshold value.

Also, the main controller 290 controls the motor controller 262 to turn the tracking servo on at step (S780), which was turned off at step (S715), and to re-rotate the spindle motor 270 at a predetermined speed at step (S785). For example, the spindle motor 270 can be rotated at the original speed of the spindle motor 270 prior to step (S710). After step (S785), the main controller 290 repeats steps (S715) to step (S785) until a focusing state signal (F_OK) of 'low' is received from the focusing state signal generator 222 at step (S750). Where required, however, it is possible to omit steps (S780) and (S785).

FIG. 8A is a view showing an example variation in a TE level detected by the TE level detector after the selection of the reproducing stop request part of FIG. 2. FIG. 8B is a view showing example variations in gain supplied to the spindle driver after the selection of the reproducing stop request part of FIG. 2.

The TE signal shown in FIG. 8A is a crosscutting signal that is caused by the eccentricity of the optical disk 200a. The crosscutting signal occurs only if the optical disk 200a rotates in a state where the tracking servo is turned off. The peak-to-peak level of the crosscutting signal is reduced over time.

Referring to FIGS. 8A and 8B, dashed line 1 represents the stage where the reproducing stop request signal is received from the reproducing stop request part 282 by the main controller 290 (i.e., step S710 of FIG. 6). The interval between lines 1 and 2 represents the stage where the tracking servo is turned off and the focusing gain is increased (i.e., step S715 and S720 of FIG. 6), the interval between lines 2 and 3 represents the stage where the initial TE signal level is detected after the tracking servo is turned off (i.e., step S725 of FIG. 6)

The interval between lines 3 and 4 represents the stage where the predetermined brake driving voltage is provided for the predetermined time (T ms) to stop the rotation of the spindle motor 270 (i.e., step S730 of FIG. 6). Dashed line 4 represents the stage where the TE signal level detected by the TE level detector 235 is identical to or less than the predetermined reverse rotation threshold value (i.e., step S735 of FIG. 6), and the interval between lines 4 and 5 represents the stage where the reverse rotation preventing voltage is provided for the predetermined time (S ms) to prevent the reverse rotation of the spindle motor 270 (i.e., step S740 of FIG. 6).

The interval between lines 5 and 6 represents the stage where the TE signal level detected by the TE level detector 235 is identical to or less than the predetermined stop threshold value (i.e., step S745 of FIG. 6), and dashed line 6 represents the stage where the determination of whether the focusing servo is dropped or not is performed (i.e., step S750 of FIG. 6).

According to the above description of the optical disk drive 200 and the method of controlling the spindle motor, the determination regarding when to stop the spindle motor 270 is performed by using the tracking error signal attenuation caused by the stopping of the tracking servo. That is, when the tracking servo is stopped, the crosscutting of the tracking error signal caused by the eccentricity of the optical disk 200a attenuates. Therefore, it is possible to control the rotation/stop operations of the spindle motor without an extra device such as a hole sensor.

Although the optical disk drive 200 is described by way of an example embodiment, the embodiments of the present invention can be applied in any applicable optical recording/reproducing apparatus. That is, the embodiments of the present invention can be applied in any device using an optical disk for recording or reproducing data.

By providing an optical disk drive 200 and method for controlling the spindle motor 270, the embodiments of the present invention analyze the attenuation of the detected TE signal, i.e., variation in the level of the TE signal, to supply the brake voltage to the spindle motor 270 in order to stop the reproduction of data from the optical disk.

Also, the spindle motor 270 is prevented from reverse-rotating at a high speed which could result from the supplied brake voltage. Also, as the tray is only opened after checking the TE level and confirming the optical disk has stopped, the tray is prevented from being opened suddenly during the rotation of the optical disk. Since the DC motor only is used to perform the above operations, without requiring any additional devices such as a hole sensor, the associated manufacturing costs are also reduced.

The foregoing embodiments and advantages are merely exemplary, and are not to be construed as limiting the present invention. The description of the present invention is intended to be illustrative, and not limit the scope of the claims. Many alternatives, modifications and variations will be apparent to those skilled in the art, the scope of which is defined in the claims and their equivalents.

What is claimed is:

1. An optical disk drive, which controls a spindle motor, comprising:

a pickup reading data from a disk and outputting the read data in the form of a radio frequency signal;

a radio frequency signal processor generating at least one of a tracking error signal and a focusing error signal from the radio frequency signal;

a servo processor operating at least one of a tracking servo and a focusing servo based on at least one of the tracking error signal and the focusing error signal;

a level detector detecting a level of the generated tracking error signal;

a motor processor providing a motor driving voltage;

a spindle motor rotating the disk at a speed corresponding to the motor driving voltage supplied from the motor processor;

a reproducing stop request part outputting a reproducing stop request signal to stop the disk; and a main controller performing at least one function including stopping the tracking servo on receipt of the reproducing stop request signal, supplying the spindle motor with a brake driving voltage to stop the spindle motor, and stopping the focusing servo if a brake level of the generated tracking error signal detected after the brake driving voltage is supplied is equal to or less than a predetermined stop threshold tracking error signal value, wherein the main controller controls the motor processor to supply the spindle motor with the brake driving voltage in proportion to a predetermined gain for a predetermined time when the tracking servo is stopped.

2. The optical disk drive of claim 1, wherein:

the main controller controls the motor processor to supply the spindle motor with a reverse rotation preventing voltage for a predetermined time to prevent the reverse-rotation of the spindle motor when the brake level of the generated tracking error signal is equal to or less than a predetermined reverse rotation threshold tracking error signal value, wherein the reverse rotation preventing voltage is in proportion to a predetermined reverse rotation preventing gain.

3. The optical disk drive of claim 2, wherein the radio frequency signal processor comprises:

a focusing state signal generator generating a focusing state signal to determine if the focusing is normal or abnormal in the focusing servo when a reverse rotation preventing level of the generated tracking error signal detected after the reverse rotation preventing voltage is supplied is equal to or less than the stop threshold tracking error signal value, wherein the main controller determines if the focusing is normal or abnormal based on an analysis of the focusing state signal.

4. The optical disk drive of claim 3, wherein:

the main controller stops the focusing servo if it is determined that the focusing is normal based on the analysis of the focusing state signal; and the main controller controls the servo processor to compensate for a focusing error if it is determined that the focusing servo is abnormal based on the analysis of the focusing state signal.

5. The optical disk drive of claim 1, wherein:

the main controller controls the servo processor to increase a focusing gain when the tracking servo is stopped and before the brake driving voltage is supplied to prevent the focusing error of the focusing servo.

6. The optical disk drive of claim 1, wherein:

the main controller sets the predetermined stop threshold tracking error signal value to a value substantially between about 3% and about 8% of a generated tracking error signal level initially detected after the stoppage of the tracking servo.

7. The optical disk drive of claim 2, wherein:

the main controller sets the predetermined reverse rotation threshold tracking error signal value to a value substantially between about 8% and about 12% of a generated tracking error signal level initially detected after the stoppage of the tracking servo.

8. A method of controlling a spindle motor of an optical disk drive, which reads data from a disk rotated by the spindle motor and outputs the read data in the form of a radio frequency signal, and detects a level of a tracking error signal generated from the radio frequency signal, the method comprising the steps of:

receiving a reproducing stop request signal to stop the disk;

stopping a tracking servo on receipt of the reproducing stop request signal;

temporarily storing an initial level of the tracking error signal detected after stoppage of the tracking servo;

supplying the spindle motor with a brake driving voltage to stop the rotation of the spindle motor;

comparing a brake level of the tracking error signal detected after the supply of the brake driving voltage with a predetermined stop threshold tracking error signal value; and stopping a focusing servo if the brake level of the tracking error signal is equal to or less than the stop threshold tracking error signal value.

9. The method of claim 8, wherein the brake driving voltage supply step supplies the spindle motor with the brake driving voltage in proportion to a predetermined gain for a predetermined time.

10. The method of claim 8, further comprising the steps of:

comparing the brake level of the tracking error signal with a predetermined reverse rotation threshold tracking error signal value after the brake driving voltage supply step; and supplying the spindle motor with a reverse rotation preventing voltage for a predetermined time to prevent the reverse-rotation of the spindle motor if the brake level of the tracking error signal is equal to or less than the reverse rotation threshold tracking error signal value.

11. The method of claim 10, further comprising the steps of:

comparing a reverse rotation preventing level of the tracking error signal detected after the reverse rotation preventing voltage supply with the stop threshold tracking error signal value after the reverse rotation preventing voltage supply step;

determining whether the focusing is normal or abnormal if the reverse rotation preventing level of the tracking error signal is less than the stop threshold tracking error signal value; and stopping the focusing servo if it is determined that the focusing is normal.

12. The method of claim 11, further comprising the step of compensating for a focusing error if it is determined that the focusing is abnormal.

13. The method of claim 8, further comprising the step of increasing a focusing gain to prevent the focusing error of the focusing servo after the tracking servo stopping step.

14. The method of claim 8, wherein the stop threshold tracking error signal is a value substantially between about 3% and about 8% of an initial tracking error signal level detected after the stoppage of the tracking servo.

15. The method of claim 10, wherein the reverse rotation threshold tracking error signal is a value substantially between about 8% and about 12% of the initial tracking error signal level detected after the stoppage of the tracking servo.

* * * * *